United States Patent [19]

Parks

[11] 4,389,380
[45] Jun. 21, 1983

[54] MULTIPLE-STAGE THERMAL BENEFICIATION PROCESS FOR PHOSPHATE ORES

[75] Inventor: Kenneth L. Parks, Plant City, Fla.

[73] Assignee: Agrico Chemical Company, Tulsa, Okla.

[21] Appl. No.: 338,868

[22] Filed: Jan. 12, 1982

[51] Int. Cl.$^3$ .......................... C01F 1/00; C01F 5/00; C01F 11/00; C01B 25/26

[52] U.S. Cl. .................................. 423/167; 423/304; 423/319; 432/15

[58] Field of Search ............... 423/166, 167, 319, 304; 432/15

[56] References Cited

U.S. PATENT DOCUMENTS 3,995,987  12/1976  MacAskill ............................. 432/15
4,017,585   4/1977  Angevine et al. .................. 423/167
4,325,928   4/1982  Lowe .................................... 423/319

Primary Examiner—Brian E. Hearn
Assistant Examiner—Gregory A. Heller
Attorney, Agent, or Firm—Richards, Harris & Medlock

[57] ABSTRACT

A multiple-stage thermal beneficiation process for phosphate ores which comprises calcining a phosphate ore in a first stage at a temperature sufficient to destroy substantial quantities of organic impurities in the phosphate ore but not so high as to cause excessive sulfide formation; followed by the calcining of the product from the first stage in a second stage at a temperature at which an additional amount of organic carbon impurities are destroyed but at a temperature which does not detrimentally reduce the surface area of the phosphate ore.

9 Claims, 5 Drawing Figures

MULTIPLE-STAGE THERMAL BENEFICIATION PROCESS FOR PHOSPHATE ORES

TECHNICAL FIELD

The present invention relates to the calcining of ores. In particular, the present invention relates to the calcining of phosphate rock and other ores to remove impurities and control sulfide formation.

BACKGROUND AND SUMMARY OF THE INVENTION

Fertilizer may be manufactured in a number of manners. The three primary nutrients of interest in fertilizers are nitrogen, phosphorous (usually expressed as $P_2O_5$), and potassium (expressed as $K_2O$). The major source for the phosphorous component is phosphate rock. As used herein, "phosphate rock" shall refer to mineral deposits which may be processed to render the phosphate content useful for the manufacture of fertilizer. Phosphate rock is commonly derived from mineable deposits of apatite which has the general formula $Ca_5(F,Cl,OH,\frac{1}{2}CO_3)(PO_4)_3$ or as phosphorite which is a sedimentary rock containing phosphate bearing minerals. Phosphate rock is treated by acidulation to produce phosphate in a form more available to plants. Acidulation of phosphate rock is accomplished by the treatment of phosphate rock with an acid, such as sulfuric or nitric acid. The general equation for the process when sulfuric acid is utilized is:

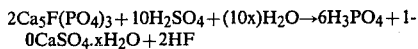

$$2Ca_5F(PO_4)_3 + 10H_2SO_4 + (10x)H_2O \rightarrow 6H_3PO_4 + 10CaSO_4 \cdot xH_2O + 2HF$$

Phosphate rock deposits vary in terms of quality and quantity. The value of a deposit depends upon consideration of its BPL (bone phosphate of lime) content, which is the phosphate content of the rock expressed as percent tricalcium phosphate, $Ca_3(PO_4)_2$, and the type and amount of residual impurities. In the past, the Bone Valley, Florida deposit has been the significant domestic commercial source. The original phosphate rock mined there was of such quality that it could be processed directly upon grinding and acidulation to produce phosphoric acid. The acidulation process produces a phosphoric acid-calcium sulfate slurry containing other salts which requires solid-liquid separation by filtration. As used herein and as known in the art, the term "wet process phosphoric acid" will refer to the liquid product above described which results from the acidulation process, wherein phosphate rock is reacted with sulfuric acid to produce gypsum ($CaSO_4 \cdot 2H_2O$) and an impure solution of phosphoric acid.

As the higher grade ores were depleted, it became necessary to utilize phosphate ores containing moderate to high levels of organic matter. The level of organic matter expressed as weight percent organic carbon is considered moderate when the organic carbon content of the ore is in the range of about 0.3% to about 1.5% and is considered as high above about 1.5%. Ores containing moderate to high levels of organic impurities are difficult to process or unprocessable in conventional wet process phosphoric acid plants. The difficulty or inability to process these ores is a result of the impurities present. The organic matter in combination with evolved carbon dioxide frequently gives rise to voluminous and stable froths and prevents adequate reaction control during the conversion of the ore into phosphoric acid and the by-product calcium sulfate crystals. These froths may overflow the reactor vessel resulting in the loss of significant quantities of product, as well as requiring costly clean-up. The presence or organic matter impurities may also affect the size and shape of crystals of calcium sulfate which are formed during the reaction of phosphate rock and sulfuric acid to produce wet process phosphoric acid-calcium sulfate slurries. Separation of this by-product from the wet process acid is hindered by the crystals formed, as well as the tendency of the insoluble organic residues to coat the crystals.

In an effort to render ores containing moderate to high levels of organic impurities suitable for acidulation, the industry turned to the calcining of the phosphate rock. Calcining of the rock removed major amounts of the organic impurities. Calcining has been traditionally performed in a single-stage fluidized bed reactor or rotary kiln.

In order to minimize the difficulty in controlling the single-stage fluidized bed reaction approach, MacAskill disclosed a two-stage calcining method in U.S. Pat. No. 3,995,987 issued Dec. 7, 1976, which utilized a high capacity first stage in which the temperature was crudely controlled and in which incomplete combustion occurred. The second stage was a closely controlled stage to achieve complete combustion so as to achieve thermal efficiency. This two-stage process permitted better control of temperature and more economical use of fuel. It did not address serious problems such as loss of reactivity and sulfide generation. During the thermal treatment of phosphate rock containing organic impurities, at least two side reactions may take place which, if not controlled, negate the benefits obtained by the overall reduction in the organic impurities of the ore. These deficiencies are (1) a loss of reactivity, generally a reduction in the rates of calcium or phosphorous solubility and the loss of phosphorous in the waste by-product calcium sulfate, and (2) generation of reduced sulfur species, such as sulfides, by the reaction of the organic impurities with naturally occurring oxidized sulfur compounds in the rock. These naturally occurring sulfur compounds include sulfates or organo-sulfur compounds which occur in most sedimentary phosphate ores, such as those found in the Pungo River deposit located in North Carolina and along the East Coast of the United States.

The reduced solubility of calcium and phosphorous and phosphorous loss to the by-product calcium sulfate decreases the efficiency of the acidulation process. Generation of reduced sulfur species, such as sulfides, produces compounds which are extremely corrosive in the acidulation processes. These corrosive sulfur species attack and destroy wetted metal parts found in wet process phosphoric acid manufacturing equipment. Thus, ores containing higher levels of sulfide impurities have heretofore been unusable or difficult to use in an economical manufacture of phosphoric acid because of increased cost for replacement of conventional equipment or fabrication of process equipment from expensive corrosion resistant materials. Additionally, the loss of reactivity has also adversely affected the economic processing of such phosphate rocks.

The present invention for calcining rock minimizes generation of reduced sulfur species while maintaining acceptable reactivity of the calcium and phosphorous compounds in the rock and permits significant reduction in the level of organic carbon impurities. The feature of the present invention to achieve these objects is the utilization of a multi-stage calcining process in which the conditions of the first stage are sufficient for the destruction of a major portion of the organic impurities but at which the generation of reduced sulfur species is minimized. The product of the first stage is then fed to a second stage wherein again the oxygen level, temperature and residence time are controlled to produce a product with the desired reactivity, residual carbon content and sulfide value. The temperature and residence time utilized are that combination which maximizes the surface area of the calcined product while achieving the desired levels of residual carbon and sulfides. This maximized surface area increases the reactivity of the calcined ore during acidulation. Excess oxygen is provided in the first stage to assure maximum destruction of the organic matter. Excess oxygen is also utilized in the second stage to prevent a reducing environment which would generate additional sulfides.

In the preferred embodiment, the first stage is operated at a temperature in the range of from about 1140° F. to about 1200° F. and preferably from about 1150° F. to about 1180° F., and most preferably at about 1175° F. Oxygen is supplied to the first stage in the form of fluidizing air. An excess of about 10% to about 500% air is utilized, about 30% or more air being preferred. In the second stage, the ore is heated to a temperature which allows retention of a maximum surface area while minimizing the carbon and sulfide content of the calcined ore. The second stage temperature, when phosphate rock is being processed, is preferably from about 1180° F. to 1500° F. and more preferably from about 1270° F. to about 1330° F. The heating of the second stage in the preferred embodiment is conducted in an atmosphere of excess oxygen, as supplied by air, of greater than about 50% excess air. Although the temperature ranges specified for each stage overlap, it will be apparent to those skilled in the art upon reading the disclosure that each stage is to be operated at a different temperature.

The phosphate rock produced has a low content of reduced sulfur compounds and thus is minimally corrosive when acidified. In addition, the carbon content has been reduced such that the adverse influence of residual carbon when the phosphate rock is acidulated has been reduced to an acceptable level, or a lower level. The product of the present process is also characterized by a high reactivity as measured by the rate of calcium and phosphate solubility.

BRIEF DESCRIPTION OF THE DRAWINGS

A more complete understanding of the invention and its advantages will be apparent from the following Detailed Description taken in conjunction with the accompanying Drawings in which.

DETAILED DESCRIPTION

The present invention is a multi-stage process for the calcining of phosphate rock or other ores. Those skilled in the art will recognize that the calcining process of the present invention may be conducted in a number of manners and by the use of different types of equipment, such as rotary kilns or fluidized bed reactors. In the process of the present invention, the temperature is closely monitored to achieve the desired results. Therefore, process equipment, such as fluidized bed reactors capable of more precise control are desirable.

Fluidized bed technology is well known. Fluid bed reactors operate by the fluidization of a bed of finely divided solid particles by rising process gas which produces a solid-gas contact. The gas rising through the bed causes the bed to behave as a boiling liquid and thus a reactor in which this occurs is termed a "fluidized bed" reactor. When the process gas is fed at higher velocities (transport velocities), the particles are fully suspended in the gas stream and may be carried out of the reaction zone. This latter configuration is referred to as a suspension or flash furnace.

Fluid bed processes are characterized by their high heat transfer rate which results from the large surface area available for heat transfer in the finely divided fluidized bed. The characteristics of fluid bed processes are particularly suitable for the practice of the present invention to produce a phosphate ore with minimum corrosive characteristics, while simultaneously removing organic carbon impurities at a commercially acceptable rate.

Figure 1:
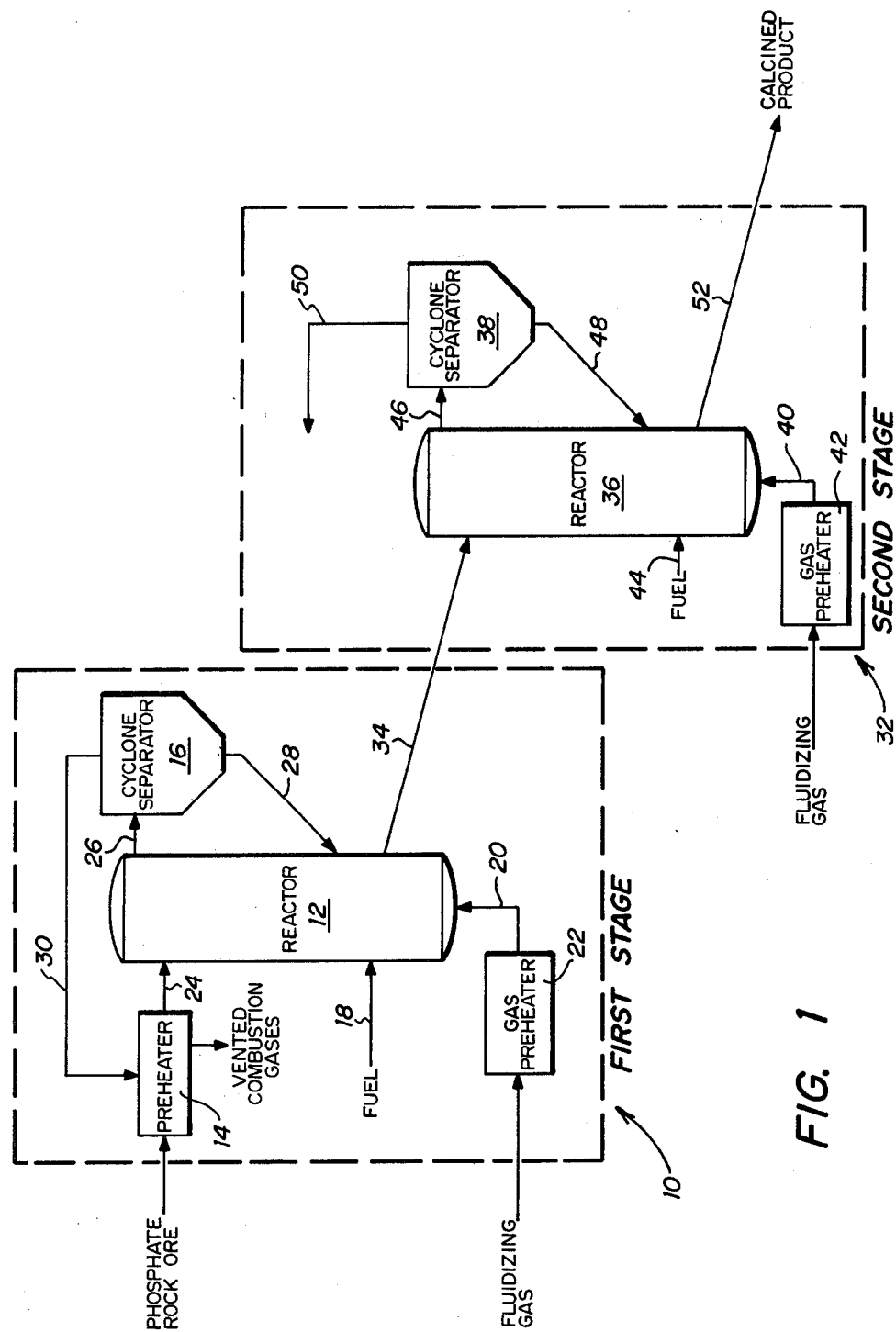
FIG. 1 is a schematic representation of the process of the present invention.

That portion of an ore body that contains economically recoverable phosphate values is normally referred to as the phosphate matrix. The phosphate matrix is mined and then beneficiated by removal of sand and other materials through known techniques. This beneficiated phosphate matrix is usually referred to as phosphate ore. Phosphate deposits found in North Carolina are particularly attractive because in many locations the beneficiated phosphate matrix has a particle size range suitable for feed to a fluidized bed reactor, thereby eliminating the need for a crushing or grinding step. Generally, a particle size range from about 20 mesh to about 200 mesh (Tyler) is effective in the process of the present invention. Those skilled in the art will appreciate that the particle size may vary beyond this range. The dry, beneficiated phosphate rock is then fed into the first stage, indicated generally as 10 in FIG. 1. The primary component of the first stage 10 is a fluidized reaction vessel 12. Other components of the first stage may include a rock preheater 14, a cyclone separator 16, fuel inlet line 18, fluidizing gas inlet line 20 and fluidizing gas preheater 22. The beneficiated ore is preferably preheated to about 275° F. and is then fed to reactor 12 via line 24. The preheated phosphate rock is then fluidized by a preheated oxygen rich gas entering via line 20 at a predetermined flow rate. The fluidizing gas rises through a gas distribution plate, and thence through the bed of phosphate rock. Controlled amounts of fuel are added to maintain the proper operating temperature. The hot combustion gases and any entrained solids flow to cyclone separator 16 via line 26. In cyclone separator 16, entrained phosphate rock particles and any entrained solid fuel are separated and returned via line 28 to the reactor 12. The solids-free hot combustion gases are preferably recycled for use in the process, for example, being flowed through line 30 to preheater 14 or preheater 22 to capture their heat values. After the phosphate ore has been heated at a temperature sufficient to remove a majority of the organic carbon, while minimizing the generation or reduced sulfur compounds, the phosphate rock is then flowed to the second stage, generally indicated as 32 in the figure, via line 34.

Although preheater 14 is not necessary for operation of the first stage, it is desirable in the preferred embodiment that the ore be preheated. Preheating the phosphate rock is helpful in controlling the temperature in the first stage reaction vessel 12. In the present invention, the temperature of the first stage is precisely controlled so as to consistently produce a phosphate rock with minimum sulfide and residual organic carbon.

Preheating of both the phosphate rock feed and fluidizing gas enhance the ability to monitor and control the temperature of the fluidized bed. The temperature of a fluid bed reactor is dependent upon the feed of fuel, oxygen, and the type of reaction occurring within the vessel, e.g., exothermic or endothermic. Because of the high heat capacity of the fluidized bed relative to the gas within it, the greater the solid content of the fluidized bed, the greater the ability of the fluidized bed to absorb temperature surges. Likewise, the more closely the temperature of the feed approximates the temperature of the material in the fluidized bed, the less the temperature of the bed will be affected by the introduction of the feed. Thus, minimizing sources for fluctuation of the bed temperature by the preheating of the feed, fluidizing gas or both, allows more precise control of the bed temperature by variation of the fuel and oxygen feed.

Preventing surges in the temperature of the bed further aids in maintaining the precise temperature control by minimizing fluctuation in the reaction rate of the reactions occurring in the bed. Reaction rates from many chemical reactions can changes exponentially with variations in temperature, sometimes doubling within a temperature change of 10° C. Thus, it is also beneficial for the precise control of the temperature within the first stage reactor 12 by minimizing changes in the reaction rates of reactions occurring within the vessel.

The fluidizing gas which is fed through line 20 is an oxidizing gas, preferably air. The gas flow rate should be sufficient to maintain a fluidized bed and the required oxygen for fuel combustion and the desired amount of excess oxygen. Turbulent agitation within the bed is desired as it breaks up and disperses localized hot spots which may occur if the bed is not sufficiently agitated. It has been determined that gas flow rates of between about 2 and about 15 or more feet per second through the bed may be used and preferably from about 3 to about 4 feet per second. As the purpose of the first stage is to maximize organic carbon removal, it is preferred that an excess oxygen level be maintained. Excess oxygen may be supplied through the use of excess air. Preferably excess air in the range of 30% or more excess air is admitted to the reactor 12.

The fuel utilized may be any suitable fuel such as oil, gas or coal. Preferably, the fuel is less than one-half inch coal for economic reasons. Hot combustion gases may also be a source of heat. Fuel is metered into the reactor 12 and burned at a rate that will maintain the desired temperature in the reactor 12. Among other things, the feed rate of the fuel will be a function of the feed rate of phosphate rock to the reactor, average retention time and composition of the phosphate rock, inlet air flow, heat radiation losses and heat recovery practices.

The feed rate of phosphate rock to the reactor is adjusted so that the average retention time of the phosphate rock within the reactor is in the range of about 0.33 to about 1.5 hours and preferably from about 0.9 to about 1.1 hours. Long retention times are economically undesirable and may result in excessive decomposition of carbonates, and loss of reactivity. The preferred reaction time must be experimentally determined for each new ore source by heating the phosphate rock at temperatures in the range of from 1140° to 1200° F. for various time periods to reduce the carbon content to either an adequately low value or to a steady state value. Experience has demonstrated that an adequate first stage removal of organic carbon is about 65% or more of the initial phosphate rock carbon. Removal of about 65% or more of the carbon in the initial phase minimizes the formation of sulfide during the second stage thermal treatment. The time required to accomplish this carbon removal is a unique characteristic of the material being calcined and the particular organic matter involved, and the procedures used in operating the calciner.

The temperature selected for the first stage is from about 1140° F. to about 1200° F. and preferably is within the range of about 1150° F. to about 1180° F. and most preferably at about 1175° F. These temperature ranges are selected for the first stage to minimize sulfide formation through the reduction of sulfate by any residual organic matter present in the phosphate rock. It is desirable to maintain the temperature of the first stage below 1200° F. because the reaction rate of sulfide formation through the reduction of sulfate by organic matter or its decomposition products occurs at a rapid rate above that temperature. At temperatures below about 1180° F., the organic matter in the phosphate rock is partially destroyed or rendered inert. Some organic matter or organic residue typically remains intact in this temperature range and must be removed at the higher temperatures of the second stage.

The oxygen level in the calciners can be controlled (1) by changing the fuel to air ratio, (2) by adding oxygen to the inlet air to increase the oxygen level or (3) by adding an inert gas such as nitrogen to the inlet air to lower the oxygen ratio. It may also be possible to utilize an oxygen consuming gas, such as carbon monoxide for fuel and oxygen level control.

The product from the first stage 10 is conveyed to the second stage 32 via conduit 34. The second stage is characterized by a second fluidized bed reactor 36 and cyclone separator 38. The second stage 32 operates similarly to the first stage 10.

Oxidizing gas, preferably air, is fed into the reactor 36 via line 40 and passes through a distribution plate and fluidizes the phosphate rock bed within reactor 36. Preferably the oxidizing gas is preheated by the second gas preheater 42. Fuel is metered into reactor 36 via fuel line 44 in sufficient quantity to maintain the reactor bed at the desired temperature.

The hot fluidizing gas and any entrained solid fuel exit the reactor via line 46 and enter cyclone separator 38 which separates entrained partially calcined phosphate rock which is returned to reactor 36 via line 48. The hot gases exit the cyclone separator 38 in conduit 50 to be recycled in the process such as to preheaters 14, 22 and 42, or prepared for exhaust to the atmosphere.

The calcined phosphate rock product exits reactor 36 via line 52 for further processing. Further processing of the calcined phosphate rock product will typically involve cooling the product and storage of the cooled product prior to sale or on-site consumption.

As in the first stage 10, the temperature of the second stage 32 is controlled by the metered introduction of fuel through line 44. The reaction in the second stage is conducted with above about 10% excess air up to about 500% excess air, and preferably is conducted by utilizing more than about 50% excess air.

The retention time of the phosphate rock in the second reactor 36 is controlled by the dimensions of the bed, as well as the flow rate of the phosphate rock. The retention time is generally in the range of from about 0.03 to about 0.8 hours and preferably about 0.5 hours. Again, it is desirable to to avoid prolonged rentention times to minimize the excessive decomposition of desirable carbonates, and loss of reactivity.

The temperature at which the second stage is operated is a temperature sufficient to combust organic impurities (not removed in the first stage) and/or convert them to a form which does not interfere with the acidulation process, but not so high as to adversely reduce the surface area of the calcined product. As used herein, the terms "destroy", "destroyed" or "destruction" when used in relation to organic impurities indicates the impurities have been combusted and/or converted to a form which does not interfere with the acidulation process. Generally, the surface area of the calcined phosphate rock decreases as the temperature at which the calcining is performed increases. A suitable temperature range may be determined experimentally by heating a sample of the phosphate rock to a temperature at which organic impurities are removed and at which the surface area of the product is optimized. The second stage temperature will be higher than the first stage temperature and may be any temperature above about 1180° F. It has been determined that temperatures in the range of about 1180° F. to about 1330° F. are suitable and that the preferred temperature is dependent upon the product to be calcined. A temperature in the range of from about 1280° F. to about 1330° F. is believed to be preferable for the calcining of typical North Carolina phosphate rock.

The temperature ranges disclosed for the first and second stage overlap. It will be apparent to those skilled in the art upon reading the specification in its entirety that the stages cannot be operated at the same temperature and still produce a phosphate ore which exhibits improved characteristics for acidulation. The overlap of the temperature ranges disclosed is necessary because the temperatures ranges over which the stages can operate will vary with the particular phosphate ore calcined. As explained herein, the temperature at which each step is operated will generally represent the selection of an optimum temperature. Factors considered in selecting the temperature of each stage include, the ore to be calcined, the amount of organic carbon impurities to be destroyed, the level of sulfide content which can be achieved, the surface area of the product, and economics of the calcining process and acidulation process. It is anticipated that with any particular ore processed in accordance with the present invention that normally the second stage will be operated at a temperature of about 100° F. or more above the first stage temperature.

As in the first stage, the oxygen level in the reactor 36 of the second stage 32 may be controlled by adjustment of the fuel to air ratio, adding oxygen to the inlet air or by adding inert gas such as nitrogen to the inlet air. As discussed earlier, the purpose of the present invention is to remove impurities which contribute to foaming problems during acidulation, cloth and/or cake blockage during filtration and also to optimize the reactivity of the calcined phosphate rock used during the production of wet process acid.

While one embodiment of the present invention has been described in detail herein and shown in the schematic drawing, it will be evident that various further modifications are possible without departing from the scope of the invention.

EXAMPLES

The following examples are presented to further enable one of ordinary skill in the art to practice the present invention. In addition, they exemplify the results achievable by the method of the present invention.

Samples were taken from beneficiated but uncalcined North Carolina phosphate rock. The analyses of the samples on a dry basis were as follows:

| Component | Weight % on a Dry Basis |
|---|---|
| $P_2O_5$ | 29.8 to 30.8 |
| BPL | 65.2 to 66.7 |
| Acid Insolubles | 3.0 to 4.0 |
| CaO | 47.4 to 49.6 |
| MgO | 0.5 to 0.7 |
| $Fe_2O_3$ | 0.6 to 0.8 |
| $Al_2O_3$ | 0.3 to 0.5 |
| $Na_2O$ | 0.9 to 1.1 |
| $K_2O$ | 0.08 to 0.12 |
| F | 3.3 to 3.8 |
| Acid Evolved Sulfide-S | 0.01 to 0.07 |
| Total Sulfur S | 0.95 to 1.2 |
| Acid Evolved $CO_2$ | 5.7 to 6.1 |
| Inorganic C as C | 1.5 to 1.7 |
| Organic C as C | 0.9 to 1.3 |

This uncalcined phosphate rock has a surface area in the range of 15 to 19 square meters/gram.

Several methods are used in the industry to determine the organic carbon content of phosphate rock. The values of organic carbon reported herein were determined by grinding a rock sample, evolving the inorganic carbon dioxide from the sample, oxidizing of the organic carbon to carbon dioxide followed by measurement of the oxided organic carbon as carbon dioxide and subsequent calculation to obtain the organic carbon content. The procedure utilized was as follows. A sample of ground rock is weighed. The carbonates and sulfides are removed by refluxing the ground rock sample in 2 N sulfuric acid and mercuric oxide under a nitrogen atmosphere. The solution is heated sufficiently to maintain boiling for approximately fifteen minutes. During this step, the gas is vented to the atmosphere by disconnecting the capture vessel at the top of the condenser. Next, the oxidation of organic carbon is accomplished by reconnecting the capture assembly to the condenser and filling the capture trap with 0.1 N sodium hydroxide. The nitrogen atmosphere is maintained. Dichromate-sulfuric acid solution is added slowly while minimal bubbling is maintained in the capture traps. During addition of the dichromate-sulfuric acid solution, the nitrogen flow may be stopped but should be returned once the addition is completed. The solution is returned to a boil and boiled for approximately thirty minutes. The capture solution is combined with washings from the capture lines. The next step is titration of the collected carbon dioxide. To the capture solution 10 drops of phenolphthalein is added. This solution is titrated with 0.5 N hydrochloric acid until some loss of coloration is observed. At this point, titration is continued with 0.05 N hydrochloric acid until the faint color disappears. This volume is recorded as $V_1$. Ten drops of methyl red indicator are then added to the solution and titration continued until a faint pink color is observed. The sample is boiled until this color reverts to yellow. The sample is cooled to room temperature and titrated with 0.05 N hydrochloric acid until a permanent pink end point is achieved. The total volume is recorded as $V_2$. To ensure that there are no carbonate impurities in the capture solution and to eliminate any possible contamination of the capture solution by carbon dioxide, a blank sample should be run. The blank sample is run according to the procedure except that no rock sample is used. If the volume of the blank is greater than 20% of the final titration volume, the sample size should be increased accordingly. The percent of organic carbon is calculated by the following formula:

$$\% \text{ Organic C} = \frac{(V_2 - V_1 - \text{Blank Volume}) \times \text{N HCL} \times 1.2}{\text{grams of sample}}$$

The value N HCL is determined as follows. Accurately weight 350–360 mg portions of dried primary standard grade $Na_2CO_3$ and dissolve in 50 ml boiled distilled water. To this solution, add three drops of methyl red indicator. Titrate with hydrochloric acid solution until a faint pink color is observed. The sample is boiled until the color reverts to yellow. The sample is cooled to room temperature and titrated until a pink end point is observed. The volume of titrant is recorded. The normality of the hydrochloric acid is calculated by the following equation:

$$\text{N HCL} = \frac{\text{g } Na_2CO_3}{0.053 \times \text{Volume HCL}}$$

To illustrate the effect which heat treatment at various temperature levels can have upon properties of the calcined ore, reference is made to the following table.

TABLE 1

Variations in Properties as Effected by Various Calcination Treatments

| Treatment | Relative Specific Surface | Relative Organic C | Relative Sulfide | Corrosion Rates* | Relative Filtration Performance** | MtP$_2$O$_5$ m$^2$-d** |
|---|---|---|---|---|---|---|
| None | 1.0 | 1.0 | 1 | very low | very erratic | 4 to 6 |
| 1150° F. for 1 hr. | 0.5 | 0.4 | 6 | low | low | 5.0 |
| 1300° F. for 1 hr. | 0.15 | 0.1 | 40 | high | good | 6.5 |
| 1500° F. for 1 hr. | 0.02 | 0.05 | 8 | low | low | 4.5 |

*In reference to corrosion rates, "very low" is less than about 5 mils/yr., "low" is less than about 10 mils/yr. and "high" is more than about 10 mils/yr. as determined by the method discussed herein.
**Relative performance was measured as metric tons P$_2$O$_5$/square meter-day (MtP$_2$O$_5$/m$^2$-d).

As the above table illustrates, uncalcined raw phosphate rock containing high organic carbon, a high surface area and low sulfide content yields low corrosion rates when compared to calcined phosphate rock, but it had a very low and erratic relative performance. Production rate as used in this table refers to filtration rates in the units metric tone of P$_2$O$_5$ obtained per 24 hr. day per square meter of active filler surface. The very erratic production performance of untreated phosphate rock containing a high degree of organic contaminants is caused by the formation of foams upon acidulation and low filtration rates due to oily organic residues forming on the filter cake. The table indicates that low corrosion rates and sulfide content may be produced by calcining at either 1150° F. or 1500° F. However, the performance of the rock calcined at these temperatures is less than rock calcined at 1300° F. The present invention achieves relatively low corrosion rates and relatively good performance by two separate heat treatments of the phosphate rock.

The present invention is a multiple-stage thermal beneficiation process for phosphate ores in which initial calcination is performed at a temperature which allows destruction of organic matter but is low enough that significant amounts of sulfate, or other oxidized sulfur compounds, are not reduced to sulfide. The first stage is followed by a second calcination step at a higher temperature at which further organic and inorganic carbon are expelled and only a minimal amount of reduced sulfur is generated. The second stage temperature is selected in order to exercise control over the surface area, or reactivity, of the final phosphate rock ore.

To illustrate the present invention, an uncalcined sample of beneficiated phosphate ore from eastern North Carolina of the composition specified above was initially calcined for one hour in a fluid bed reactor at a temperature of 1175° F. (635° C.), followed by a second calcining at 1300° F. (704° C.) for thirty minutes. The cooled product had the following assay:

Specific surface area, meters$^2$/gram: 2.2
Organic carbon content, weight percent: 0.07
Sulfide content, weight percent: 0.10

A sample of the same ore was treated in a single-stage calcining process in a fluid bed reactor at 1300° F. for about ½ hour. The product produced had the following assay:

Specific surface area, meters$^2$/gram of: 2.6
Organic carbon content, weight percent: 0.23
Sulfide content, weight percent: 0.32

The calcined products produced by the two tests above were tested in a laboratory scale phosphoric reactor to produce both gypsum and 28% P$_2$O$_5$ wet process phosphoric acid. The products were also tested to obtain an average industrial filtration rate as well as an estimate of expected corrosion rates of 317L stainless steel. The values determined are reported in Table 2.

TABLE 2

Comparison of Calcined Products

| Test | Treatment Two-Stage at 1150° F./1300° F. | Single-Stage at 1300° F. |
|---|---|---|
| Filtration rate, metric tons of P$_2$O$_5$/square meters per day | 6.5 | 4.7 |
| Corrosion rate, mils per year of 317L stainless steel | 7 | 28 |

These test comparisons show that the two-stage process achieves an increase in the filtration rate of nearly 40% while simultaneously achieving a decrease in the corrosion rate of approximately 75%.

CORROSION TEST METHOD

The corrosion tests were conducted in the following manner. Test samples of 317, Jessop 700, and Uranus B-6 stainless steels measuring 12±1 square inches were suspended in a test reactor during acidulation of the calcined rock. The acidulation process produces phosphoric acid by continuously reacting the calcined phosphate rock with sulfuric acid in a slurry of gypsum crystals, thus continuously forming fresh gypsum and acid. The liquid portion of the slurry consists of phosphoric acid and excess sulfuric acid plus any dissolved impurities. Typical slurry conditions were approximately 35 weight percent solids and 65 weight percent liquid. Slurry is continuously overflowed from the reactor during the corrosion tests. The test reactor temperature was maintained at 80° C. (176° F.). Test samples of the stainless steels under investigation were retained in the test reactor for a minimum of 80 hours, but generally for an average of 100 hours. The test samples were prevented from contacting each other or the test reactor walls by a rubber coupon holder. During the test cycle, the samples were briefly removed once every eight hours and checked for signs of scale build-up or coating. Any scale build-up or coating was removed from the samples before reinsertion into the test reactor. At the end of the test cycle, the samples were removed and rinsed with distilled water. The samples were then soaked briefly in distilled water to loosen any adherent coating which was then removed by gently cleaning with a brass wire brush. A brief soak in dilute (0.1 N) nitric acid was used when persistent deposits were encountered. The test samples were thoroughly rinsed with distilled water, air dried and their weight loss was determined. The corrosion rate was then calculated as follows:

$$\text{Corrosion Rate (Mils/Yr.)} = \frac{(W)(534)}{(T)(P)(E.S.)}$$

where:
W = Weight loss in milligrams
534 = Combined conversion factor for converting milligrams to grams, hours to years, grams per cubic centimeter to grams per cubic inch, and inches to mils.
T = Time exposed in hours
P = Metal density in grams per cubic centimeter.
E.S. = Exposed surface in square inches.

SURFACE AREA MEASUREMENTS

The surface areas for phosphate rock feeds and calciner products were determined on a "MONOSORB" surface area instrument manufactured by Quantachrome Corporation, Syosset, New York. The instrument determines the quantity of nitrogen gas adsorbed on the sample's surface by measuring the change in thermal conductivity of a flowing mixture of nitrogen and helium carrier gas. The quantity of gas adsorbed on the sample surface at partial surface coverage (partial pressure less than 1) can be related to the amount adsorbed at total surface coverage through the B.E.T. (Brunauer, Emmett, Teller) equation which will be discussed following the summary of the test procedure.

The sample is first degassed by loading the sample cell and connecting it to the degassing port of the instrument where the sample is heated to 145±5° C. for 40 minutes in the stream of 30% nitrogen/70% helium carrier gas. The self-sealing sample cell is then transferred to the measurement port of the instrument where it is again exposed to the nitrogen/helium gas stream. The cell is immersed in a liquid nitrogen bath and nitrogen gas is adsorbed from the $N_2$/He gas stream onto the sample surface. When equilibrium has been established, the liquid nitrogen bath is removed and replaced with a room temperature water bath to aid desorption of the nitrogen from the sample surface. At this point there is an excess of nitrogen in the nitrogen/helium gas stream and this excess is determined by thermal conductivity techniques. The instrument is programmed to convert the volume of nitrogen desorbed to a total sample surface area. The total surface area in square meters is divided by the sample weight in grams to obtain specific surface in square meters per gram. The instrument is calibrated by injection of one cubic centimeter of air each operating day and spot checks for accuracy are made using an alumina sample whose surface area is known to be 1.4±0.1 square meters per gram.

The quantity of nitrogen gas adsorbed by the sample is converted to surface area using a modified form of the B.E.T. equation, which is:

$$\frac{P}{X(Po - P)} = \frac{1}{X_m C} + \frac{(C-1)P}{X_m C\, Po}$$

Where:
P = Adsorbate (nitrogen) vapor pressure
Po = Adsorbate saturation pressure at the temperature of the coolant bath
$X_m$ = Weight of absorbate required to cover the surface area with one molecular layer
C = A constant which is a function of adsorbate/adsorbant interaction energy
X = Weight of adsorbate on a surface in equilibrium with a given relative pressure, P/Po.

In the classical method, data at several partial pressures of adsorbate would be obtained and a plot of $$\frac{P}{X(Po - P)}$$

vs. partial pressure would be made. The region of this plot at lower partial pressures is linear and (1/XmC) represents the intercept while $$\frac{C-1}{X_m C}$$

represents the slope. In practice, the intercept is usually close to zero as C, the adsorbate/adsorbant interaction energy is usually quite large. The assumption in the single point method utilized by the Monosorb instrument is that C is infinite. Solving the B.E.T. equation for Xm yields:

$$Xm = X \frac{Po}{P} - 1 \frac{1}{C} + \frac{(C-1)}{(C)} \frac{P}{Po}$$

which reduces to:

$$Xm = X\left(1 - \frac{P}{Po}\right)$$

when C=infinity.
This equation is equivalent to:

$$Xm = P^*VM/RT\left(1 - \frac{P}{Po}\right)$$

Where:
V = The volume of gas adsorbed on the sample surface
P* = Ambient pressure during determination
M = Molecular weight of adsorbate (nitrogen in this case)
R = Gas content
T = Ambient temperature in °K.

The total surface area can be obtained by multiplying the moles of gas which would be adsorbed at total coverage by the cross-sectional area per molecule which is $16.2 \times 10^{-20}$ square meters for $N_2$. Thus total surface area equals:

$$\frac{(Xm)}{M}(N)(16.2 \times 10^{-20} \text{ meter}^2/\text{molecule})$$

Where:
N = Avogadro's number
M = Molecular weight of adsorbate.

Figure 2A:
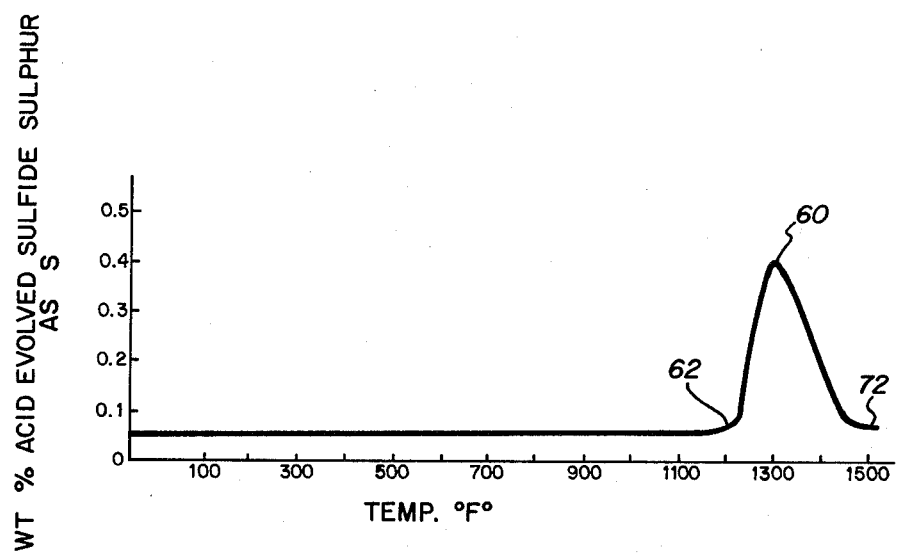
FIG. 2A is a graph illustrating sulfide content as a function of temperature.
Figure 2B:
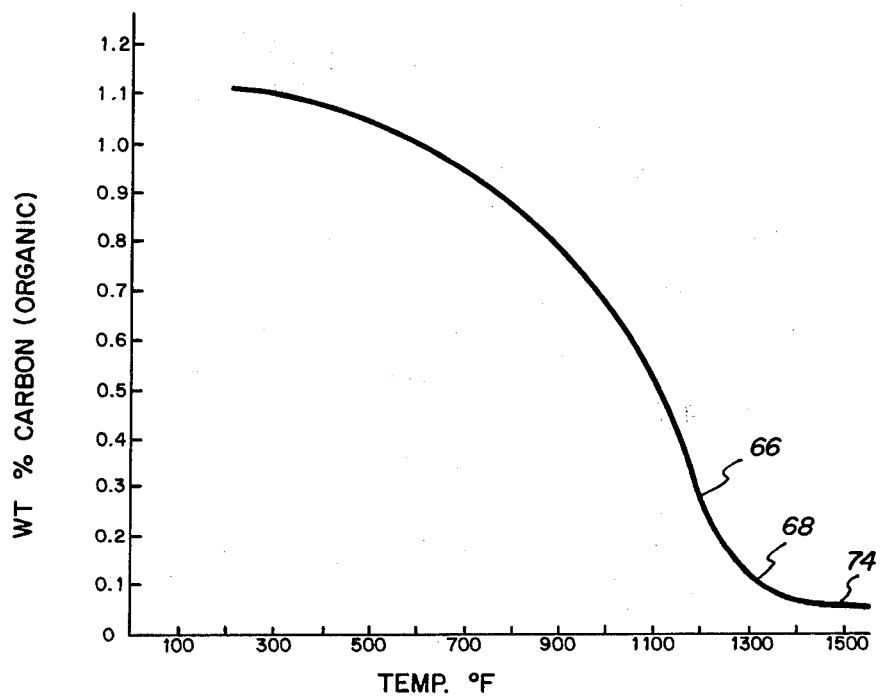
FIG. 2B is a graph illustrating organic carbon content as a function of temperature.
Figure 2C:
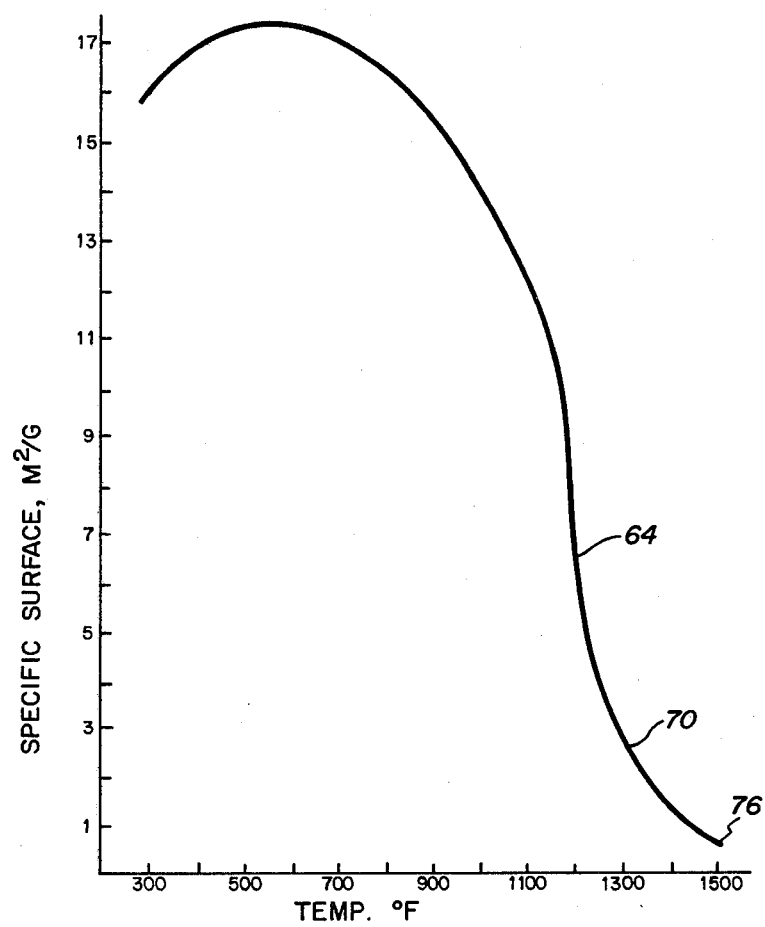
FIG. 2C is a graph illustrating the surface area as a function of temperature.

The advantages of the method of the present invention may be demonstrated by reference to FIGS. 2A, 2B, 2C and 2D. Comparison of FIGS. 2A, 2B and 2C illustrates the interrelation in a single stage process of sulfide generation, organic carbon reduction and surface area change as a function of temperature, when phosphate ores have the composition characteristics of North Carolina phosphate rock.

FIG. 2A illustrates that ore calcined at temperatures from about 1200° F. to about 1475° F. have a sulfide content higher than ore calcined at lower or higher temperature. The greatest generation of sulfide occurs at about 1300° F. (point 60 on the graph).

FIG. 2B demonstrates that the organic carbon content decreases with temperature and that the decrease is significant between approximately about 1000° F. and 1300° F.

FIG. 2C demonstrates that the surface area is dramatically reduced when the ore is heated to temperatures between 1100° F. and 1300° F. At temperatures above 1300° F., the surface area continues to decrease but at a slower rate.

Thus, a single-stage calcination conducted at approximately 1200° F. results in a calcined ore with (a) low sulfide content approximately 0.07 (point 62 in FIG. 2A) and therefore is relatively noncorrosive, and (b) good surface area in the range of about 6.5 meters squared per gram (point 64 in FIG. 2C); however, at such temperature, the organic carbon content of more than about 0.3% organic carbon at 1200° F. This organic carbon level has an adverse effect on the filtration rates and processing rate during acidulation.

In a single-stage calcining conducted at 1300° F., a high percentage, approximately 0.42% (point 60 in FIG. 2A), of sulfide is generated; however, higher amounts of organic carbon are removed. The organic carbon has been reduced to about 0.12% (point 68 in FIG. 2B) and the surface area approximately 2.5 meters squared per gram (point 70 in FIG. 2C). While a desirable result of reduced carbon content has been achieved, the high sulfide content of the calcined product renders the product undesirable for wet process phosphoric acid plants as the calcined ore is highly corrosive to wetted metal parts of the acidulation processing equipment.

A single-stage calcining conducted at 1500° F. results in a product of low sulfide content, low carbon content and extremely low surface area. The ore calcined at 1500° F. has a sulfide content of about 0.1%, point 72, FIG. 2A, a carbon content of about 0.1%, point 74, FIG. 2B, and a surface area about 0.5 m²/g, point 76, FIG. 2C. While the product of a single-stage calcining process conducted at 1500° F. has good corrosion characteristics and avoids the adverse carbon content, it is undesirable in terms of reactivity and filtration rates because of the very low surface area.

Figure 2D:
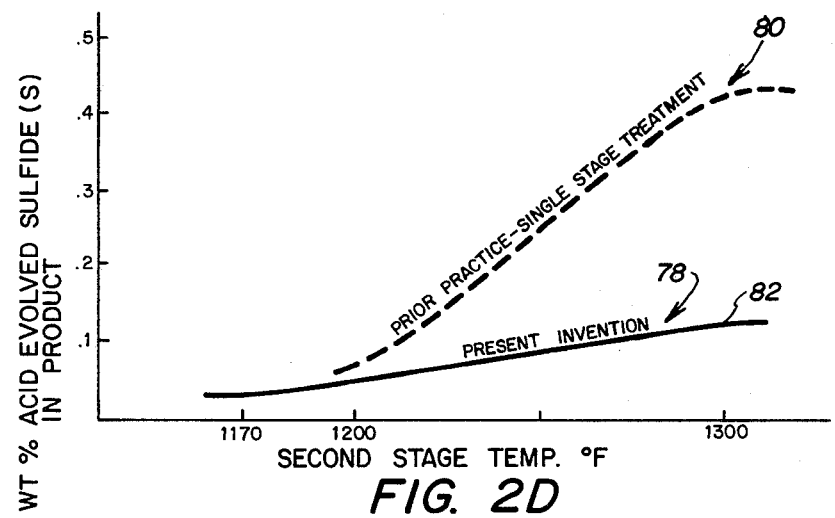
FIG. 2D is a graph illustrating the sulfide content of the calcined product produced by the method of the present invention.

The two-stage process of the present invention allows phosphate rock with higher levels of organic impurities to be processed such that a calcined product more suitable for acidulation may be produced. FIG. 2D is a graph showing the sulfide content of a calcined phosphate rock which has been processed according to the present invention. The ore in the first stage was calcined at 1170°±10° F. for 60 minutes, and FIG. 2D illustrates the reduction in sulfide generated in the second stage by solid line 78, as compared with single stage process, dashed line 80.

In the two-step process of the present invention, in the first stage the temperature is controlled in the range of about 1140° F. to about 1200° F. Maintaining the temperature in this range prohibits excessive sulfide generation in the first stage while at the same time permitting removal of more than about 60% of the organic carbon present. The product from the first stage would be undesirable for acidulation because of the relatively high carbon content. Heating to a temperature of from about 1100° F. to 1200° F. would result in a first stage product of from about 0.53% to about 0.27% organic carbon, seen in FIG. 2B. The carbon content of the final product is reduced in the method of the present invention by calcining the ore in the second stage at a temperature in the range of 1280° F. to about 1330° F. It has been found that the amount of sulfide generated in the phosphate rock is related to the carbon content of the initial feed. When the first stage has been calcined at about 1170° F., the phosphate rock feed to the second stage contains approximately 40% of the organic carbon that was present in the feed to the first stage. Calcining at the increased temperature results in sulfide production but at a substantially lower amount as shown in FIG. 2D to be approximately 0.11% sulfide, point 82 FIG. 2D, which represents a reduction of sulfide content by the two-stage process of approximately 75% from that is achievable by the single-stage process conducted at the temperature 1300° F. The product from the two-stage process of the present invention thus has an acceptable sulfide level, an acceptable carbon level, and a maximized surface area relative to ores produced by a single-stage process with the same carbon or sulfide content.

Those skilled in the art will appreciate that the method of the present invention will be suitable for many grades of phosphate rock and not just those which are comparable to the typical composition of North Carolina phosphate rock. The selection of operating conditions will be a function of the desired characteristics of the calcined product in view of its intended use. Thus, the levels of organic carbon, sulfide and surface area sought will normally be dependent upon economic considerations concerning the operation of the calcining facility and acidulation facility.

While the preferred embodiment of the invention has been described in relation to fluid bed reactors, those skilled in the art will recognize that other types of calcining apparatus such as rotary calciners may be used.

The results achieved by the method of the present invention may be influenced by the fuel used. Fuels which may be used successfully in both stages to produce an acceptable calcined product are (a) externally generated hot combustion gases such as from the combustion of propane, and the in-bed consumption of (b) No. 2 oil, (c) No. 6 oil, or (d) coal. Coal is the fuel of choice, principally for its combustion characteristics and for economic reasons. In addition to the type of fuel utilized, the particle size of the solid fuel, such as coal, may also influence the sulfide content of the final product as demonstrated in Table 3. The values in Table 3 were determined by calcining samples of beneficiated North Carolina phosphate ore having a composition disclosed above. These samples were calcined in the two-stage process of the present invention utilizing about 50% to about 100% excess air in the first stage and about 25% to about 100% excess air in the second stage. The temperature and fuel for each stage is specified in Table 3.

TABLE 3

Influence of Fuel and Fuel Particle Size on Final Product Assay

| Heat Source for First Stage | First Stage Temperature Treatment °F. | Second Stage Fuel | Second Stage Treatment Temperature °F. | Final Product Sulfide Content Weight % |
|---|---|---|---|---|
| HCG* | 1175 | HCG* | 1300 | 0.05 |
| No. 2 Oil | 1150 | No. 2 Oil | 1300 | 0.17 |
| −8 M Coal** | 1168 | −8 M Coal | 1297 | 0.08 |
| −8 M Coal** | 1157 | −200 M Coal** | 1303 | 0.22 |
| −200 M Coal** | 1175 | −200 M Coal** | 1308 | 0.25 |

*HCG refers to hot combustion gases supplied by the combustion of propane outside of the reactor vessel.
**−8 M or −200 M coal refers to coal which will totally pass through an 8 or 200 mesh (Tyler) screen.

Another aspect of the present invention is the calcining of the phosphate rock in the presence of excess air to assure maximum destruction of organic contaminants in the first stage, thus preventing the reduction of sulfides by the organic contaminants at the elevated temperature of the second stage. The beneficial effect of excess air is demonstrated in Table 4. The data in Table 4 was developed from testing samples of uncalcined North Carolina rock in single-stage testing conducted in a one-third foot inside diameter fluidized bed reactor that was electrically heated. The fluidizing gas utilized in the test was either (a) air or (b) a mixture of 10% by volume carbon monoxide and 90% by volume nitrogen gas. The starting materials for these tests were obtained from the North Carolina deposit having the analysis outlined above, except test No. 5 where the sample tested was the product produced by test No. 2.

TABLE 4

Influence of Oxygen on Sulfide Formation

| Test No. | Fluidizing Gas | Temperature °F. | Retention Time Hours | % Carbon | % Sulfide | Surface Area, m²/g |
|---|---|---|---|---|---|---|
| 1 | CO—N₂ | 1150 | 0.5 | 0.4 | 0.40 | 14 |
| 2 | CO—N₂ | 1300 | 0.5 | 0.4 | 0.89 | 3.5 |
| 3 | Air | 1150 | 0.5 | 0.4 | 0.07 | 11 |
| 4 | Air | 1300 | 0.5 | 0.1 | 0.41 | 3.4 |
| 5 | Air | 1300 | 0.25 | 0.0 | 0.86 | 2.4 |

Comparison of test Nos. 1 and 3 in Table 4 demonstrates that the excess air (or oxygen) at the lower temperature results in significantly decreased sulfide content. Comparison of test Nos. 2 and 4 demonstrates that excess oxygen at the elevated temperature decreases carbon content and also decreases the sulfide content. In test No. 5, the product from test No. 2 was used as the feed for test No. 5. Test No. 5 demonstrates that once the sulfide is formed, the sulfides are very slowly reoxidized, even under the favorable conditions of a great excess of oxygen.

The residence time in the first stage should be sufficient to maximize the destruction of organic carbon and preferably about 65% or more of the carbon present should be destroyed in the first stage. If an adequate amount of carbon is not removed in the first stage, the second-stage product will have a higher sulfide content than it would have had if the first stage carbon content had been lower. This is demonstrated in Table 5. Two samples of North Carolina rock were calcined in a two-stage process. Sample G was held in the first stage for a lesser amount of time than sample P was held in the first stage. Samples G and P were analyzed and subsequently process in a second stage where both samples were processed under similar conditions.

TABLE 5

The Effect of the Carbon Content of the First-Stage Calcined Product on the Sulfide Content of the Second-Stage Product

| | Analysis After First Stage | | Analysis After Second Stage | | Change in Analysis | |
|---|---|---|---|---|---|---|
| Test No. | % Organic Carbon | % Sulfide | % Organic Carbon | % Sulfide | % Organic Carbon | % Sulfide |
| G | 0.55 | 0.07 | 0.18 | 0.21 | −0.37 | +0.14 |
| P | 0.41 | 0.04 | 0.18 | 0.13 | −0.23 | +0.09 |

Although the final calcined products after the second stage had the same carbon levels, indicating a final equilibrium carbon under the test conditions, the sulfide levels are significantly different. The sulfide levels are 60% higher in Sample G than in Sample P as a result of the higher carbon content of the calcined ore produced in Stage One. The amount of sulfide formed is proportional to the amount of carbon destroyed between the first-stage product and the second-stage product, i.e., −0.37/0.14 = −2.6 and −0.23/0.09 = −2.6.

While the present invention has been described with respect to the preferred embodiments thereof, various modifications and adaptations will be apparent to one of ordinary skill in the art. Therefore, the above description of the preferred embodiment is not to be understood in a limited sense and this invention is circumscribed only by the scope of the appended claims.

What is claimed is:

1. A method for calcining phosphate rock, comprising:
   (a) introducing phosphate rock to be calcined into a first stage;
   (b) heating said phosphate rock in said first stage in the presence of excess oxygen to a temperature of from about 1140° F. to about 1200° F. to destroy substantial quantities of organic carbon impurities in said phosphate rock but not to produce an undesirable quantity of sulfides;
   (c) introducing the phosphate rock into a second stage afer it has been heated in said first stage; and
   (d) heating said phosphate rock in said second stage in the presence of excess oxygen to a temperature of about 1180° F. to about 1330° F. to destroy most of the remaining organic carbon impurities but without detrimentally diminishing the reactive surface area of the phosphate rock.

2. The method of claim 1 wherein the first stage is heated to a temperature in the range of from about 1150° F. to about 1180° F.

3. The method of claim 1 or 2 wherein the second stage is heated to a temperature in the range of 1270° F. to about 1330° F.

4. The process of claim 1, 2 or 3 wherein more than about 10% oxygen is maintained in the first stage.

5. The process of claim 1, 2 or 3 wherein more than about 10% oxygen is maintained in the second stage.

6. The process of claim 1, 2 or 3 wherein said first and second stages are fueled by coal sufficiently fine to pass through a 0.50 inch screen.

7. The method of claim 1, 2 or 3 wherein said first stage is heated for a period of time from about 0.33 to about 1.3 hours, and wherein said second stage is heated from about 0.17 to about 0.8 hours.

8. A method for calcining phosphate rock comprising:
   (a) introducing phosphate rock to be calcined into a first stage;
   (b) heating said phosphate rock in said first stage in the presence of excess oxygen at a temperature in the range of from about 1150° F. to about 1180° F. for a period of time sufficient to cause the removal of a major portion of the organic carbon impurities present in said phosphate rock but not to produce an undesirable quantity of sulfides;
   (c) introducing the phosphate rock into a second stage after it has been heated in said first stage; and
   (d) heating said phosphate rock in said second stage in the presence of excess oxygen to a temperature in the range of from about 1180° F. to about 1500° F. to destroy substantially all of the remaining organic carbon impurities in said phosphate rock but without detrimentally diminishing the reactive surface area of the phosphate rock.

9. The method of claim 8 wherein said phosphate rock is heated in a first stage for a sufficient period of time to destroy more than about 65% of the organic material contained in the phosphate rock.

* * * * *

UNITED STATES PATENT AND TRADEMARK OFFICE
CERTIFICATE OF CORRECTION

PATENT NO. : 4,389,380
DATED : June 21, 1983
INVENTOR(S) : Parks

It is certified that error appears in the above—identified patent and that said Letters Patent is hereby corrected as shown below:

```
Column 3, line 44, "acidified" should be --acidulated--;
Column 5, line 4, "or" should be --of--;
Column 6, line 10, "reaction" should be --retention--;
Column 10, line 3, "tone" should be --tons--;
Column 10, line 4, "filler" should be --filter--;
Column 11, line 8, "317" should be --317L--;
Column 16, line 35, after "were" insert "then";
Column 16, line 36, "process" should be --processed--.
```

Signed and Sealed this

Twenty-third Day of August 1983

[SEAL]

Attest:

*Attesting Officer*

GERALD J. MOSSINGHOFF

*Commissioner of Patents and Trademarks*